(12) United States Patent
Wang

(10) Patent No.: US 12,543,665 B2
(45) Date of Patent: Feb. 10, 2026

(54) TREE SKIRT HAVING MAGNETIC ATTRACTION FIT STRUCTURE

(71) Applicant: Centresky Crafts (Shantou) Co., Ltd, Shantou (CN)

(72) Inventor: Youguo Wang, Shantou (CN)

(73) Assignee: Centresky Crafts (Shantou) Co., Ltd, Shantou (CN)

( * ) Notice: Subject to any disclaimer, the term of this patent is extended or adjusted under 35 U.S.C. 154(b) by 37 days.

(21) Appl. No.: 18/609,506

(22) Filed: Mar. 19, 2024

(65) Prior Publication Data
US 2025/0268156 A1    Aug. 28, 2025

(30) Foreign Application Priority Data
Feb. 23, 2024   (CN) .......................... 202420338597.X

(51) Int. Cl.
*A01G 13/30* (2025.01)
*A01G 13/31* (2025.01)

(52) U.S. Cl.
CPC .................................... *A01G 13/31* (2025.01)

(58) Field of Classification Search
CPC ......... A01G 13/31; A01G 17/00; A47G 33/04
See application file for complete search history.

(56) References Cited

U.S. PATENT DOCUMENTS

| | | | | |
|---|---|---|---|---|
| 6,349,500 B1 * | 2/2002 | Popham | ................. | A01G 17/00 47/25 |
| 11,143,359 B1 * | 10/2021 | Wang | ..................... | F16M 13/02 |
| 2002/0189161 A1 * | 12/2002 | Rice | ....................... | A01G 13/02 47/20.1 |
| 2016/0095459 A1 * | 4/2016 | Reetz | .................... | A47G 33/04 |
| 2016/0302604 A1 * | 10/2016 | Henz | ..................... | A47G 33/04 |
| 2022/0256780 A1 * | 8/2022 | Zhao | ..................... | A01G 13/02 |

* cited by examiner

*Primary Examiner* — Joshua J Michener
*Assistant Examiner* — Henry Hooper Mudd
(74) *Attorney, Agent, or Firm* — Westbridge IP LLC

(57) ABSTRACT

A tree skirt having a magnetic attraction fit structure includes: a support assembly and at least two skirt pieces, the skirt pieces are sequentially arranged along a circular track, adjacent skirt pieces are detachably connected, and the skirt pieces are enclosed to form a cavity. The support assembly includes at least two metal strips and at least two connecting members, each of the metal strips is arranged on an inner wall of the skirt piece, the metal strips are sequentially arranged along an arrangement direction of the skirt pieces, the connecting members are located between adjacent two metal strips, both ends of the connecting members are respectively provided with a slot, a magnetic component is provided on each of the connecting members, and the adjacent two metal strips are inserted into the slots at the both ends of the connecting members.

10 Claims, 5 Drawing Sheets

TREE SKIRT HAVING MAGNETIC ATTRACTION FIT STRUCTURE

CROSS-REFERENCE TO RELATED APPLICATIONS

This application claims priority to Chinese Patent Application No. 202420338597.X, filed on Feb. 23, 2024, the content of which is incorporated herein by reference in its entirety.

TECHNICAL FIELD

The present application pertains to the technical field of tree skirts, and specifically pertains to a tree skirt having a magnetic attraction fit structure.

BACKGROUND

Tree skirts are capable of decorating and protecting plants (e.g., plants such as Christmas trees that foil the festival ambience theme, daily household green plants, etc.). A tree skirt generally includes skirt pieces and a support assembly, the skirt pieces are enclosed to form a closed ring shape, and the skirt pieces extend around the plant. A support assembly generally includes a plurality of metal strips and a plurality of connecting members, each of the connecting members are located between adjacent metal strips, both ends of the connecting members have slots, and two adjacent metal strips are respectively inserted into corresponding slots. However, after the metal strips are inserted into the slots, the metal strips are mainly positioned by a friction force between the metal strips and inner walls of the slots, and the metal strips are prone to detachment from the connecting members after long-term use, resulting in deformation of the tree skirt, and leading to poor product stability, reliability and user experience.

In view of the problems, the present application is proposed.

SUMMARY

The present application provides a tree skirt having a magnetic attraction fit structure.

The present application provides the following technical solutions:

A tree skirt having a magnetic attraction fit structure includes:

at least two skirt pieces, wherein the skirt pieces are sequentially arranged along a circular track, adjacent skirt pieces are detachably connected, and the skirt pieces are enclosed to form a cavity; and a support assembly, wherein the support assembly includes at least two metal strips and at least two connecting members, each of the metal strips is arranged on an inner wall of the skirt piece, the metal strips are sequentially arranged along an arrangement direction of the skirt pieces, the connecting members are located between adjacent two metal strips, both ends of the connecting members are respectively provided with a slot, a magnetic component is provided on each of the connecting members, the adjacent two metal strips are inserted into the slots at the both ends of the connecting members, and the metal strips are magnetically attracted to the magnetic component.

Optionally, the connecting member has a through groove; and the magnetic component is arranged in the through groove, and the magnetic component divides the through groove into two slots.

Optionally, the magnetic component is a cylinder, and a circumferential surface of the magnetic component is fitted to an inner wall of the through groove.

Optionally, the magnetic component is fixed to the connecting member, or the magnetic component is movably arranged on the connecting member.

Optionally, the connecting member is made of a ferromagnetic material, and the magnetic component is magnetically attracted to the connecting member.

Optionally, the connecting member is a plastic member, and the magnetic component is interference-fitted into the through groove of the connecting member.

Optionally, one of the adjacent two metal strips is fixedly connected to the connecting member, and the other is detachably inserted into the connecting member.

Optionally, an outer surface of one of the adjacent two metal strips at an end thereof is provided with a concavo-convex pattern portion, so that the concavo-convex pattern portion is in a close fit with an inner wall of the slot in a state of being inserted into the slot.

Optionally, one of the two slots is long and the other is short, and the metal strip inserted into the slot of short length is fixedly connected to the connecting member, and a corresponding metal strip is detachably inserted into the slot of long length.

Optionally, the tree skirt having a magnetic attraction fit structure includes two support assemblies, the skirt pieces are enclosed to form an upper opening and a lower opening, and the two support assemblies are sequentially arranged in a direction from the lower opening to the upper opening.

By adopting the above technical solutions, the present application has the following beneficial effects:

The metal strips of the tree skirt of the present application are magnetically attracted to the magnetic component after being inserted into the connecting members, and the metal strips are not easily detached from the connecting members, resulting in good stability and high reliability.

BRIEF DESCRIPTION OF THE DRAWINGS

The accompanying drawings, which are incorporated in and constitute a part of the present application, are included to provide a further understanding of the present application. Illustrative embodiments of the present application and the description thereof are included to illustrate the present application, but are not to be construed as unduly limiting the present application. Apparently, the accompanying drawings in the following description are merely some rather than all embodiments of the present application, and a person of ordinary skill in the art may still derive other drawings from these accompanying drawings without creative efforts.

DETAILED DESCRIPTION OF THE EMBODIMENTS

Figure 1:
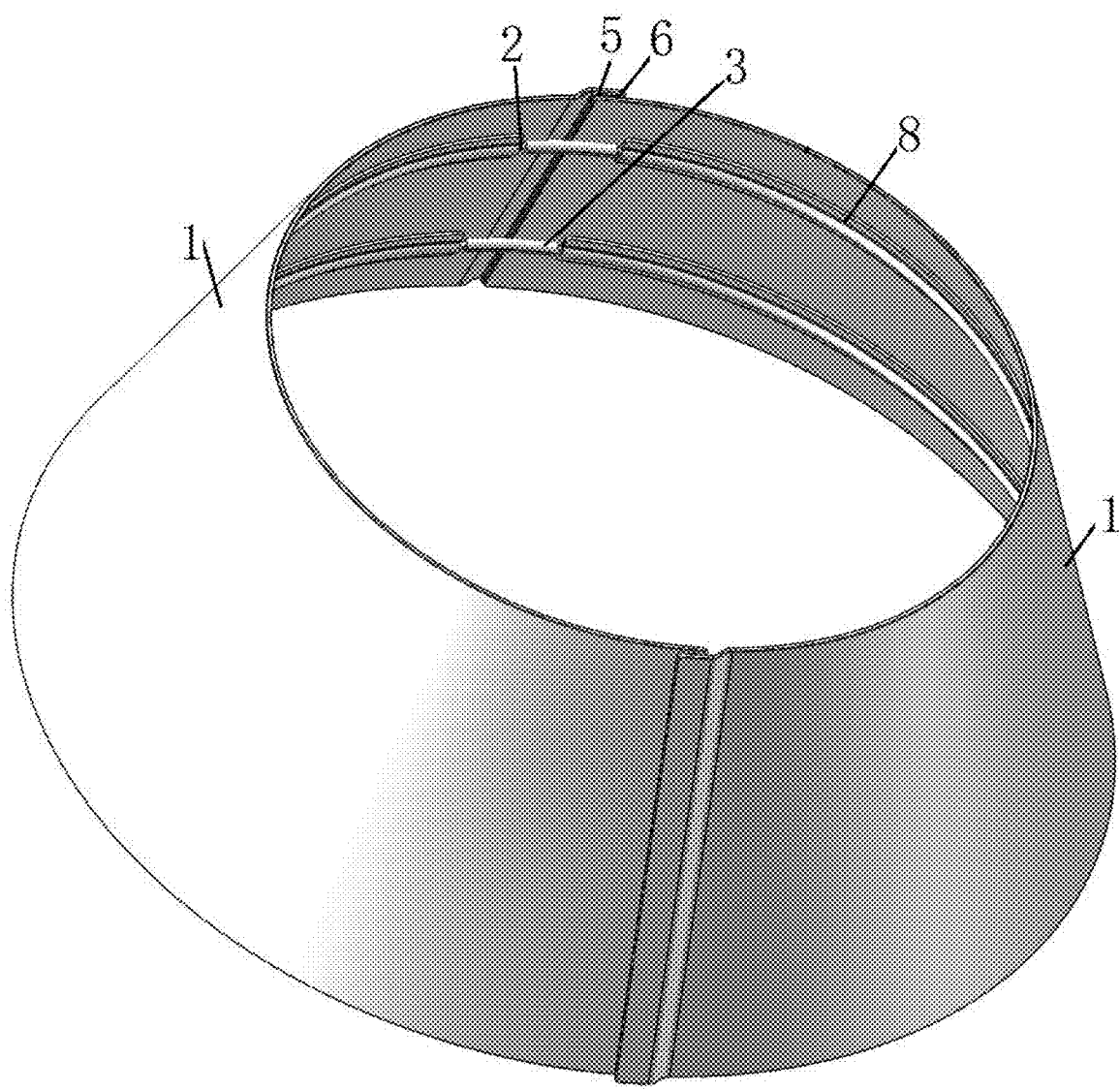
FIG. 1 illustrates a first tree skirt having a magnetic attraction fit structure according to an embodiment of the present application.
Figure 2:
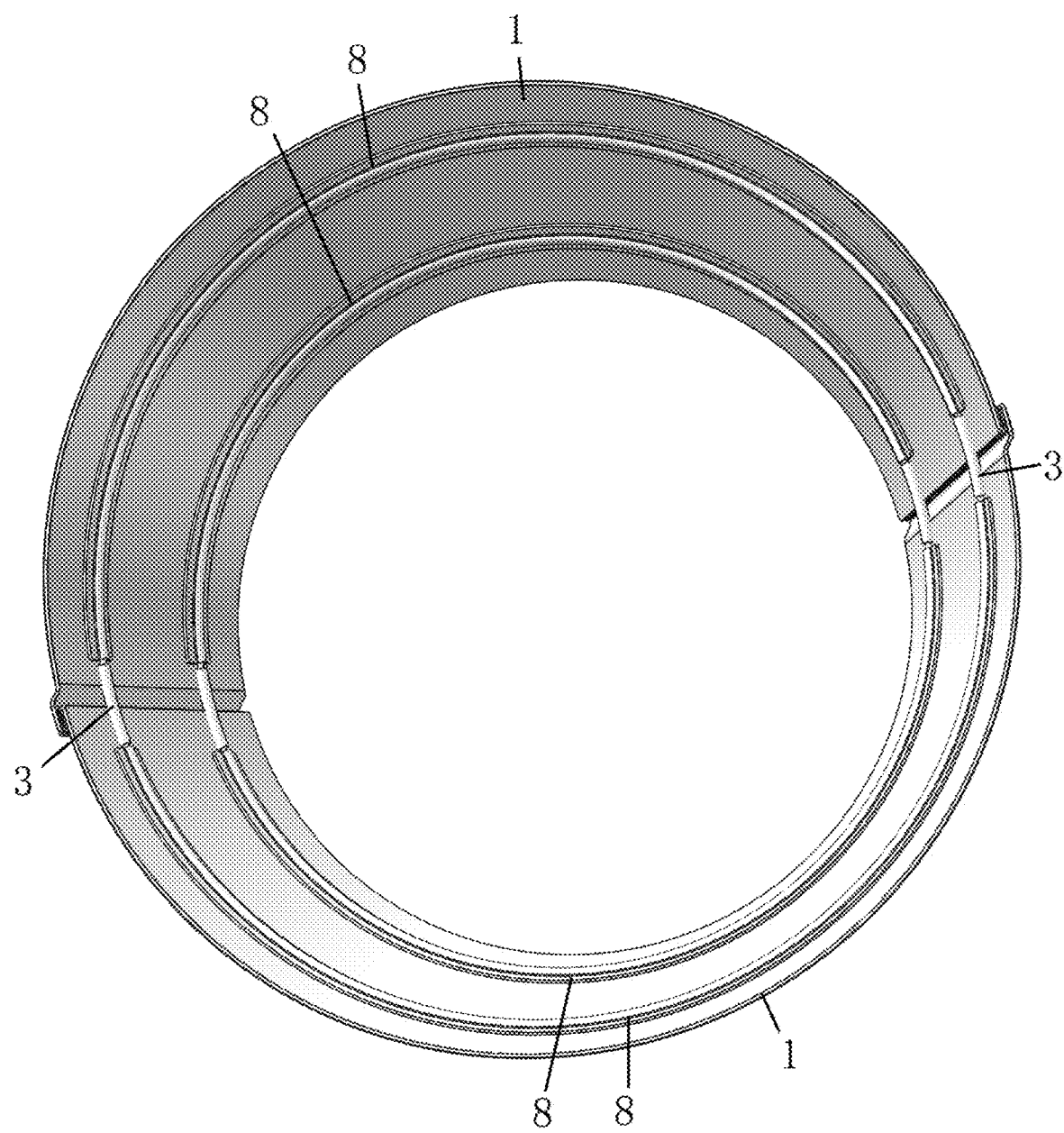
FIG. 2 illustrates a view of FIG. 1 observed from another perspective.

In order to make the purpose, technical solutions and advantages of the embodiments of the present application more clear, the technical solutions in the embodiments of the present application will be clearly and completely described below in conjunction with the accompanying drawings in the embodiments of the present application. The embodiments described below are for illustrative purposes only and are not intended to limit the scope of the present application.

In the description of the present application, it should be noted that the terms "upper", "lower", "inner", "outer" and the like indicate orientations or positional relationships based on the orientations or positional relationships shown in the drawings, and are only for convenience of description and simplification of description, but do not indicate or imply that the device or element to be referred must have a specific orientation, be constructed and be operated in a specific orientation, and thus, should not be construed as limiting the present application.

In the description of the present application, it should be noted that, unless expressly and specifically defined otherwise, the terms "mounted" and "connected" are to be interpreted broadly, and may, for example, be fixedly or detachably or integrally connected; may be mechanically connected or electrically connected; or may be directly connected or indirectly connected through an intermediary. The specific meaning of the above terms in the present application can be understood by those of ordinary skill in the art from the specific context.

As shown in FIGS. 1-5, an embodiment of the present application provides a tree skirt having a magnetic attraction fit structure, including: a support assembly and at least two skirt pieces 1. The skirt pieces 1 are sequentially arranged along a circular track, adjacent skirt pieces 1 are detachably connected, and the skirt pieces 1 are enclosed to form a cavity. The support assembly includes at least two metal strips 2 and at least two connecting members 3, each of the metal strips 2 is arranged on an inner wall of the skirt piece 1, the metal strips 2 are sequentially arranged along an arrangement direction of the skirt pieces 1, the connecting members 3 are located between adjacent two metal strips 2, both ends of the connecting members 3 are respectively provided with a slot, a magnetic component 4 is provided on each of the connecting members 3, the adjacent two metal strips 2 are inserted into the slots at the both ends of the connecting members 3, and the metal strips 2 are magnetically attracted to the magnetic component 4. The metal strips 2 of the tree skirt of the present application are magnetically attracted to the magnetic component 4 after being inserted into the connecting members 3, and the metal strips 2 are not easily detached from the connecting members 3, resulting in good stability and high reliability. The magnetic component may be a magnet, and the metal strip 2 may be made of iron, steel or other material capable of being attracted to the magnet.

Figure 4:
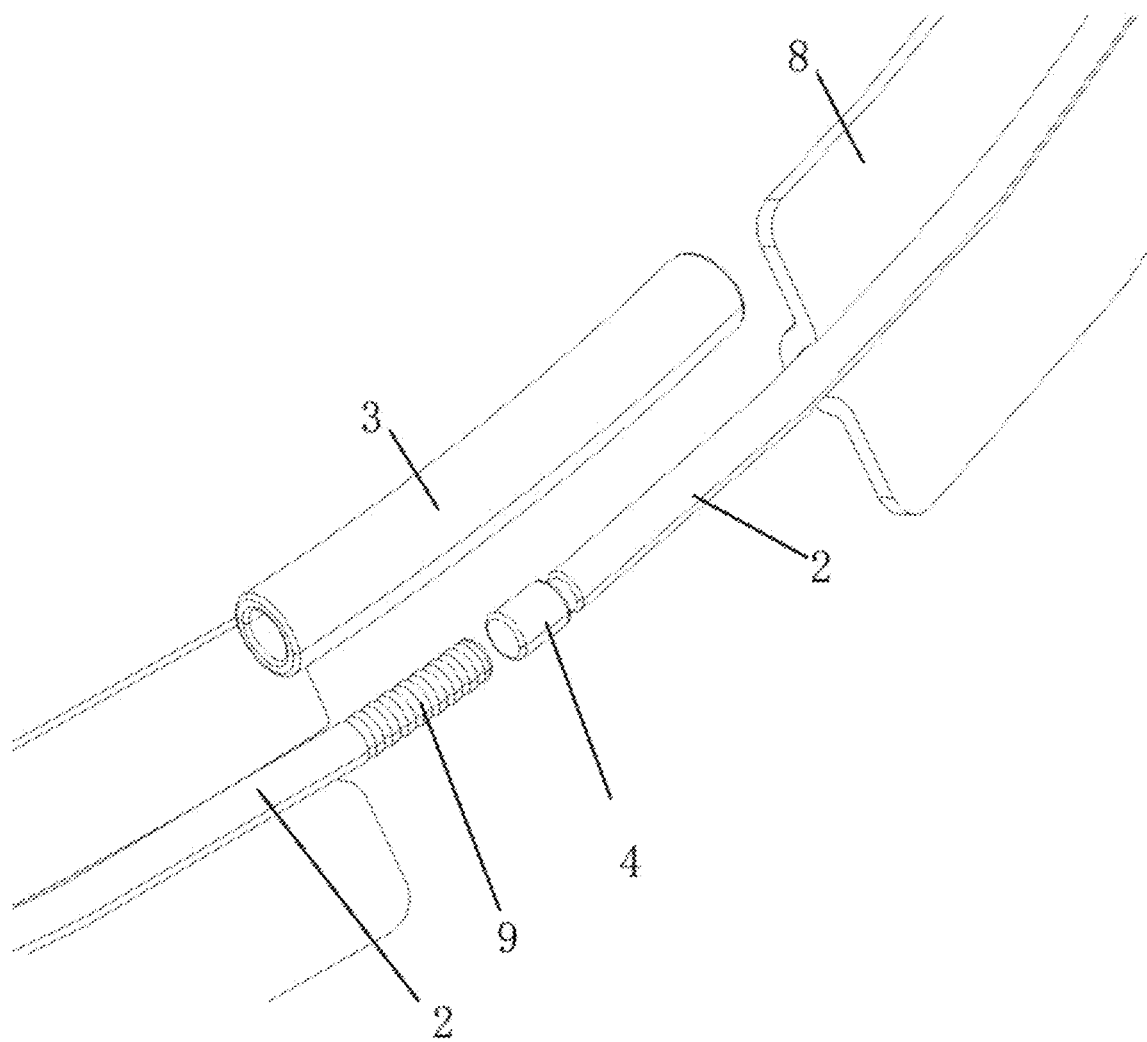
FIG. 4 is an exploded view of a fit structure of connecting members, connecting pieces, metal strips and a magnetic component in a tree skirt having a magnetic attraction fit structure according to an embodiment of the present application.

In some possible embodiments, as shown in FIG. 4, the connecting member 3 has a through groove, the magnetic component 4 is arranged in the through groove, and the magnetic component 4 divides the through groove into two slots.

The magnetic component 4 is a cylinder, and a circumferential surface of the magnetic component 4 is fitted to an inner wall of the through groove. An outer diameter of the magnetic component 4 matches an inner diameter of the through groove, and the magnetic component may be smoothly inserted into the through groove.

In some possible embodiments, the magnetic component 4 is fixed to the connecting member 3, or the magnetic component 4 is movably arranged on the connecting member 3.

For example, the connecting member 3 is made of a ferromagnetic material, the magnetic component 4 is magnetically attracted to the connecting member 3, and the magnetic component 4 is not easily detached from the connecting member 3, preventing loss.

The connecting member 3 may also be a plastic member, and the magnetic component 4 is interference-fitted into the through groove of the connecting member 3. The magnetic component 4 is fixed in position under a clamping action of the connecting member 3 and will not easily move to cause detachment.

Optionally, as shown in FIG. 4, one of the adjacent two metal strips 2 is fixedly connected to the connecting member 3, and the other is detachably inserted into the connecting member 3. The connecting member 3 is fixedly connected to one of the metal strips 2, thus reducing the need for disassembly and assembly and avoiding loss of the connecting member 3.

An outer surface of one of the adjacent two metal strips 2 at an end thereof is provided with a concavo-convex pattern portion 9, so that the concavo-convex pattern portion 9 is in a close fit with an inner wall of the slot in a state of being inserted into the slot. Arrangement of the concavo-convex pattern portion 9 increases a frictional force between the metal strip 2 and the inner wall of the slot, and improves fixing stability of the metal strip 2 and the connecting member 3.

One of the two slots is long and the other is short, and the metal strip 2 inserted into the slot of short length is fixedly connected to the connecting member 3, and a corresponding metal strip 2 is detachably inserted into the slot of long length (as shown in the metal strip 2 on the right side of FIG. 4). As the corresponding metal strip 2 is detachably inserted into the slot of long length facilitates the stability of an insertion structure between the connecting member 3 and the detachable metal strip 2, and the metal strip 2 will not be easily withdrawn from the connecting member 3, resulting in high product reliability.

Figure 5:
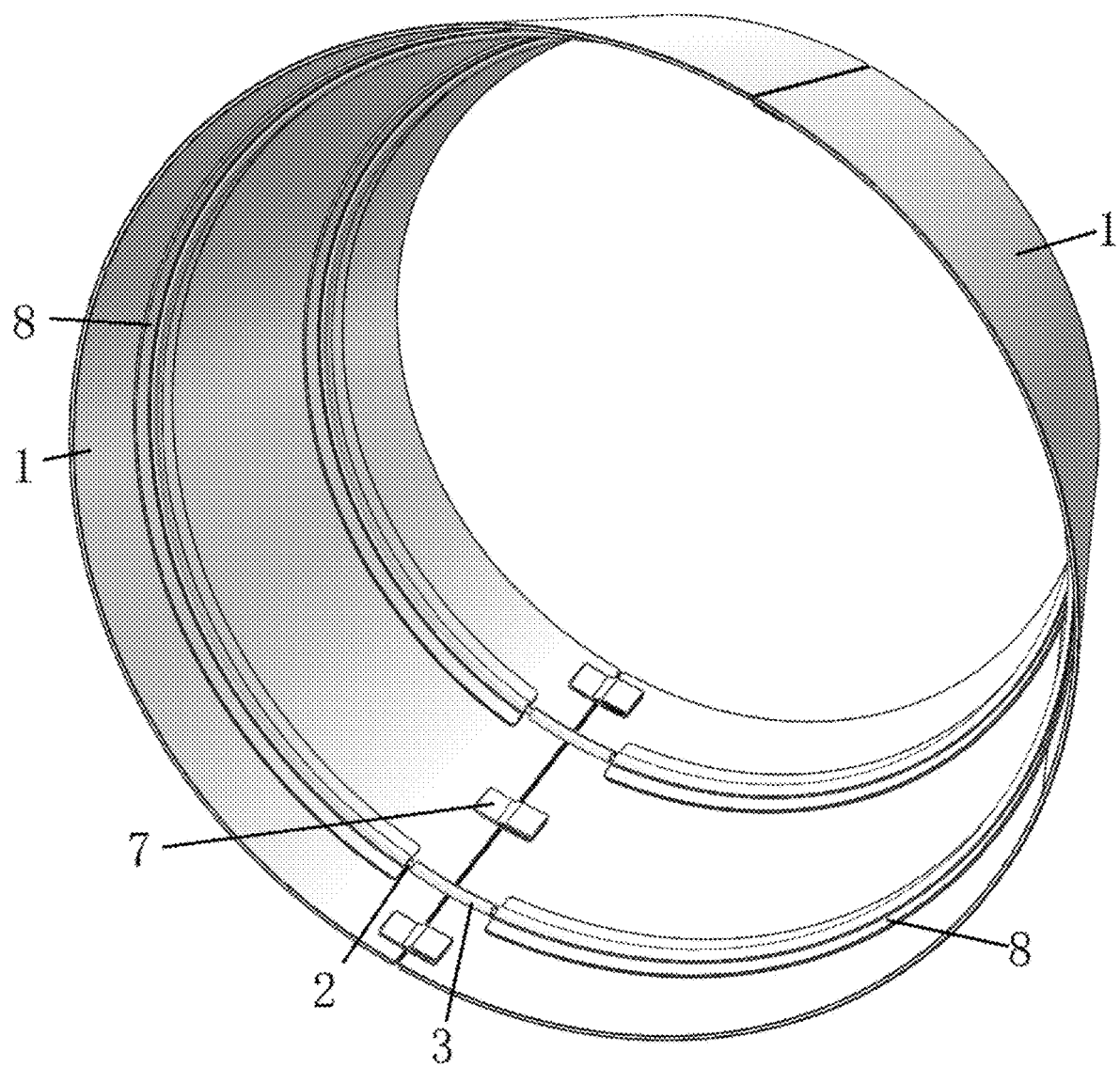
FIG. 5 is a bottom view of a third tree skirt having a magnetic attraction fit structure according to an embodiment of the present application.

As shown in FIG. 5, the tree skirt having a magnetic attraction fit structure includes two support assemblies, the skirt pieces 1 are enclosed to form an upper opening and a lower opening, and the two support assemblies are sequentially arranged in a direction from the lower opening to the upper opening. By arranging the two support assemblies, the skirt pieces 1 may be supported at both a position close to the upper opening and a position close to the lower opening, so that the skirt pieces 1 remain upright as a whole.

In some possible embodiments, as shown in FIG. 1, one of adjacent two skirt pieces 1 is provided with a loop fastener 5, and the other is provided with a hook fastener 6. The loop fastener 5 on one of the adjacent two skirt pieces and the hook fastener 6 on the other are fixed by adhering.

As shown in FIG. 1, the skirt piece 1 has main surfaces perpendicular to a thickness direction thereof, and both ends of the main surfaces are respectively provided with the loop fastener 5 and the hook fastener 6. The main surfaces of the adjacent two skirt pieces 1 at the both ends are fit together, and the loop fastener 5 on the main surfaces of one of the adjacent two skirt pieces is adhered to the hook fastener 6 on the main surfaces of the other skirt piece. The skirt piece 1 has two main surfaces respectively located on both sides of the skirt piece 1 in the thickness direction. The loop fastener 5 and a second hook fastener 6 are respectively arranged on the two main surfaces.

Figure 3:
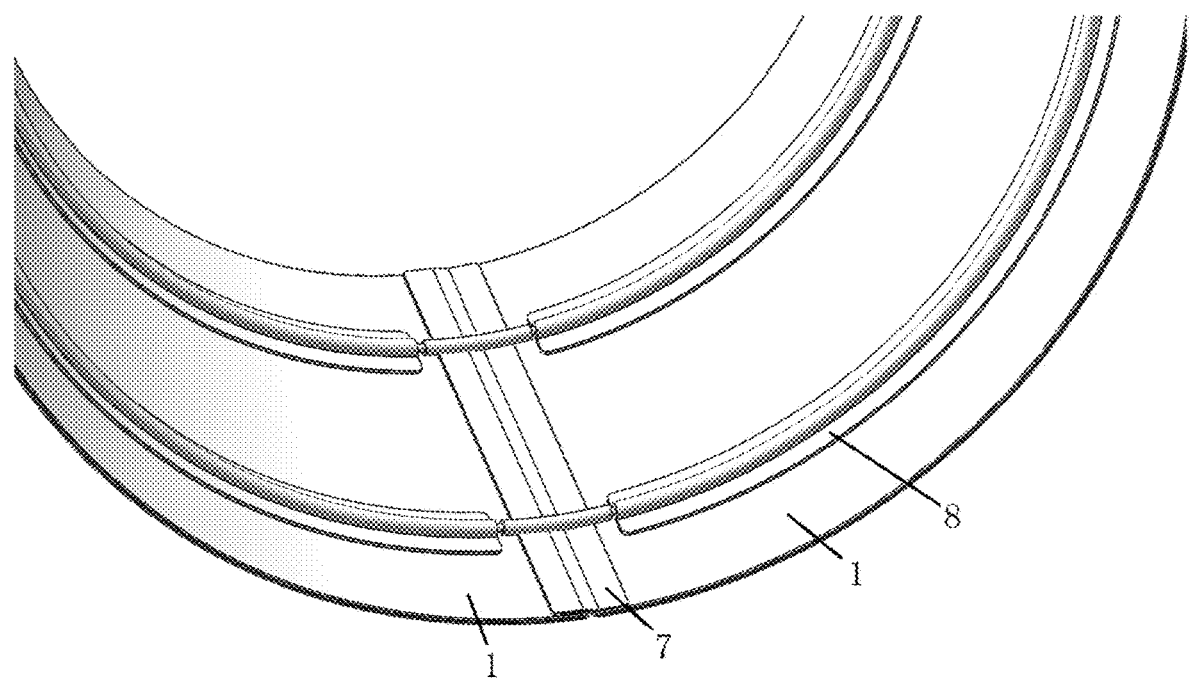
FIG. 3 is an inside view of a second tree skirt having a magnetic attraction fit structure according to an embodiment of the present application.

In some possible embodiments, as shown in FIG. 3, the both ends of the skirt piece are respectively provided with a width edge, a first adhering member is provided on the width edge of one of the two adjacent skirt pieces, and an extension piece 7 is provided on the width edge of the other, the extension piece 7 is provided with a second adhering member, thickness end faces of the two skirt pieces are fitted together, and the second adhering member on the extension piece is adhered to the first adhering member. The extension piece 7 is located inside the skirt piece, which does not affect appearance of the skirt piece. One of the first adhering member and the second adhering member may be a loop fastener, and the other may be a hook fastener.

In some possible embodiments, as shown in FIG. 5, the both ends of the skirt piece 1 are respectively provided with a width edge, a plurality of first adhering members are provided on the width edge of one of the adjacent two skirt pieces 1, the first adhering members are sequentially spaced apart along the width edge, and a plurality of extension pieces 7 are provided on the width edge of the other at intervals, and each of the extension pieces 7 is provided with a second adhering member. Thickness end surfaces of the adjacent two skirt pieces 1 are fitted together, and the second adhering members on each of the extension pieces 7 on a corresponding width edge of one of the adjacent two skirt pieces are respectively connected to corresponding first adhering members on the width edge of the other skirt piece. One of the first adhering member and the second adhering member may be a loop fastener, and the other may be a hook fastener.

The tree skirt further includes a connecting piece 8, both sides of the connecting piece 8 are respectively connected to an inner surface of the skirt piece 1, the connecting piece 8 and the skirt piece 1 are enclosed to form a threading cavity, and the metal strip 2 is arranged through the threading cavity. The connecting piece 8 may be adhered to the skirt piece 1 by a hook and loop fastener, the connecting piece 8 may also be sewn to the skirt piece 1 by means of sutures, and the connecting piece 8 may also be glued to the skirt piece 1 by means of glue.

The preferred embodiments of the present application disclosed above are intended only to illustrate the present application. It is not intended to elaborate all details of the preferred embodiments, nor is it intended to limit the application to only the specific embodiments described. Obviously, many modifications and variations are possible in light of the above teaching. The embodiments were chosen and described in order to best explain the principles and practical application of the present application and to thereby enable those skilled in the art to best understand and utilize the present application. The present application is to be limited only by the claims, along with their full scope and equivalents.

What is claimed is:

1. A tree skirt having a magnetic attraction fit structure, comprising:

at least two skirt pieces, wherein the skirt pieces are sequentially arranged along a circular track, adjacent skirt pieces are detachably connected, and the skirt pieces are enclosed to form a cavity; and a support assembly, wherein the support assembly comprises at least two metal strips and at least two connecting members, each of the metal strips is arranged on an inner wall of the skirt piece, the metal strips are sequentially arranged along an arrangement direction of the skirt pieces, the connecting members are located between adjacent two metal strips, both ends of the connecting members are respectively provided with a slot, a magnetic component is provided on each of the connecting members, the adjacent two metal strips are inserted into the slots at the both ends of the connecting members, and the metal strips are magnetically attracted to the magnetic component;

the both ends of the skirt pieces are respectively provided with a width edge, a first adhering member is provided on the width edge of one of the two adjacent skirt pieces, and an extension piece is provided on the width edge of the other, the extension piece is provided with a second adhering member, thickness end faces of the two skirt pieces are fitted together, and the second adhering member on the extension piece is adhered to the first adhering member, the extension piece is located inside the skirt piece.

2. The tree skirt according to claim 1, wherein the connecting member has a through groove; and the magnetic component is arranged in the through groove, and the magnetic component divides the through groove into two slots.

3. The tree skirt according to claim 2, wherein the magnetic component is a cylinder, and a circumferential surface of the magnetic component is fitted to an inner wall of the through groove.

4. The tree skirt according to claim 3, wherein the magnetic component is fixed to the connecting member, or the magnetic component is movably arranged on the connecting member.

5. The tree skirt according to claim 4, wherein the connecting member is made of a ferromagnetic material, and the magnetic component is magnetically attracted to the connecting member.

6. The tree skirt according to claim 4, wherein the connecting member is a plastic member, and the magnetic component is interference-fitted into the through groove of the connecting member.

7. The tree skirt according to claim 1, wherein one of the adjacent two metal strips is fixedly connected to the connecting member, and the other of the adjacent two metal strips is detachably inserted into the connecting member.

8. The tree skirt according to claim 1, wherein an outer surface of one of the adjacent two metal strips at an end thereof is provided with a concavo-convex pattern portion, so that the concavo-convex pattern portion is in a close fit with an inner wall of the slot in a state of being inserted into the slot.

9. The tree skirt according to claim 1, wherein one of the two slots has a greater length than the other, and the metal strip inserted into the slot of short length is fixedly connected to the connecting member, and a corresponding metal strip is detachably inserted into the slot of long length.

10. The tree skirt according to claim 1, comprising two support assemblies, wherein the skirt pieces are enclosed to form an upper opening and a lower opening, and the two support assemblies are sequentially arranged in a direction from the lower opening to the upper opening.

* * * * *